US 9,348,466 B2

(12) United States Patent
Briden

(10) Patent No.: US 9,348,466 B2
(45) Date of Patent: May 24, 2016

(54) TOUCH DISCRIMINATION USING FISHEYE LENS

(75) Inventor: John J Briden, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/123,365

(22) PCT Filed: Jun. 24, 2011

(86) PCT No.: PCT/US2011/041728
§ 371 (c)(1),
(2), (4) Date: Dec. 2, 2013

(87) PCT Pub. No.: WO2012/177260
PCT Pub. Date: Dec. 27, 2012

(65) Prior Publication Data
US 2014/0111457 A1    Apr. 24, 2014

(51) Int. Cl.
*G06F 3/042* (2006.01)

(52) U.S. Cl.
CPC .... *G06F 3/0425* (2013.01); *G06F 2203/04104* (2013.01)

(58) Field of Classification Search
CPC .................. G06F 3/041; G06F 3/0425; G06F 2203/04104
USPC ............. 345/156, 173, 174; 178/18.01–19.06
See application file for complete search history.

(56) References Cited

U.S. PATENT DOCUMENTS

| 8,432,366 B2* | 4/2013 | Hodges et al. ............... 345/173 |
| 2003/0085871 A1* | 5/2003 | Ogawa ......................... 345/158 |
| 2005/0190162 A1* | 9/2005 | Newton ........................ 345/175 |
| 2005/0248540 A1* | 11/2005 | Newton ........................ 345/173 |
| 2006/0279528 A1* | 12/2006 | Schobben et al. ............ 345/156 |
| 2009/0195500 A1* | 8/2009 | Huang et al. .................. 345/157 |
| 2010/0001963 A1 | 1/2010 | Doray et al. |
| 2010/0225595 A1* | 9/2010 | Hodges et al. ............... 345/173 |
| 2010/0328200 A1 | 12/2010 | Yu et al. |

(Continued)

FOREIGN PATENT DOCUMENTS

| CN | 101763198 A | 6/2010 |
| JP | 2010282463 A | 12/2010 |

OTHER PUBLICATIONS

Chia Shen, et al.; "Informing the Design of Direct-Touch Tabletops" in: Computer Graphics and Application, IEEE, vol. 26, Issue 5. pp. 36-46. Sep.-Oct. 2006.

(Continued)

*Primary Examiner* — Priyank Shah
(74) *Attorney, Agent, or Firm* — HP Inc Patent Department

(57) ABSTRACT

Embodiments of the present invention disclose a system and method of touch discrimination using a fisheye lens. According to one embodiment, touch discrimination is provided using a touch-enabled display and an imaging device equipped with a fisheye lens and housed within the display. Furthermore, image data captured using the fisheye lens of the imaging device is utilized to detect a touch on a surface of the display along with the user associated with said touch.

3 Claims, 6 Drawing Sheets

(56) References Cited

U.S. PATENT DOCUMENTS

| | | | | |
|---|---|---|---|---|
| 2011/0080490 | A1* | 4/2011 | Clarkson et al. | 348/222.1 |
| 2011/0102570 | A1* | 5/2011 | Wilf et al. | 348/77 |
| 2012/0001845 | A1* | 1/2012 | Lee | 345/156 |
| 2012/0062729 | A1* | 3/2012 | Hart et al. | 348/135 |
| 2012/0206339 | A1* | 8/2012 | Dahl | 345/156 |
| 2013/0328833 | A1* | 12/2013 | Hsieh et al. | 345/175 |
| 2014/0084014 | A1* | 3/2014 | Sim et al. | 220/669 |
| 2014/0126777 | A1* | 5/2014 | Karakotsios et al. | 382/103 |

OTHER PUBLICATIONS

Dohse, et al.; "Enhancing Multi-user Interaction with Multi-touch Tabletop Displays Using Hand Tracking"; 5 pages.
Kim, et al.; "Interaction Workspaces: Identity Tracking for Multi-user Collaboration on Camera-based Multi-touch Tabletops"; 4 Pages.
Meyer, et al.; "Idwristbands: Ir-based User Identification on Multi-touch Surfaces"; University of Lubeck; Lancaster University; 2 pages.
Olwal, et al.; "Rubbing the Fisheye: Precise Touch-screen Interaction with Gestures and Fisheye Views"; Department of Computer Science, Columbia University; 2 pages.
PCT; "Notification of Transmittal of the International Search Report and the Written Opinion of the International Searching Authority, or the Declaration" PCT/US2011/041728 mailed Feb. 9, 2012; 9 pages.
Ryall, et al.; "Idwidgets: Parameterizing Widgets by User Identity"; Merl, Cambridge University of Washington; 4 pages.
Wang, et al.; "Detecting and Leveraging Finger Orientation for Interaction with Direct-touch Surfaces"; Kochi University of Technology Japan; Oct. 4-7, 2009; pp. 23-32.

* cited by examiner

TOUCH DISCRIMINATION USING FISHEYE LENS

BACKGROUND

Providing efficient and intuitive interaction between a computer system and users thereof is essential for delivering an engaging and enjoyable user-experience. Today, most desktop computer systems include a keyboard for allowing a user to manually input information into the computer system, and a mouse for selecting or highlighting items shown on an associated display unit. As computer systems have grown in popularity, however, alternate input and interaction systems have been developed.

For example, touch-based, or touchscreen, computer systems allow a user to physically touch the display unit and have that touch registered as an input at the particular touch location, thereby enabling users to physically interact with objects shown on the display. More recently, manufacturers are experimenting with table-top or horizontal touch displays. When a touch-surface display is oriented horizontally, it is natural for multiple users to surround and interact simultaneously with the display, which can create a challenging environment for effective touch discrimination.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 1A is a three-dimensional view of users operating a horizontally-arranged touch display, while

DETAILED DESCRIPTION OF THE INVENTION

Figure 1A:
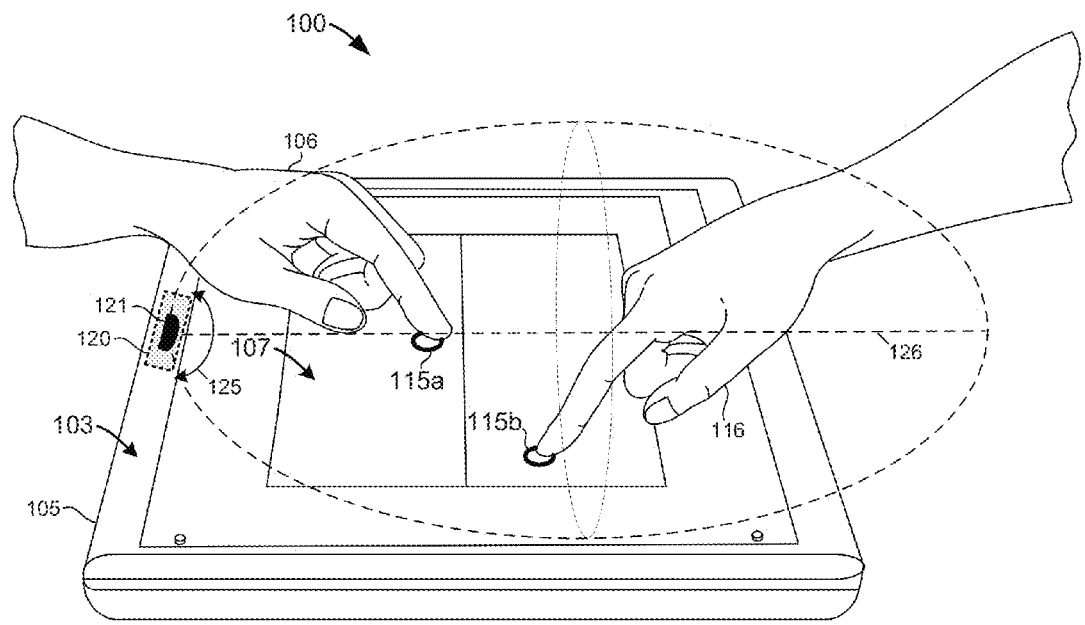

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense Current touch-detection technologies employed in desktop and tablet personal computers are unable to accurately distinguish individual touches from different users. For example, some solutions involve inferring which user is performing the touch by capturing images directly above the screen, and/or by including additional environmental sensors. Other solutions attempt to identify the touch of each operating user by having the user wear a special garment or sit on a custom stool equipped with a wired or wireless receiver. In such a case, the system recognizes touches from individual users based on a signal emitted from a number of system antennas to the receiver embedded in the garment or chair. However, each of these systems employs additional electrical components that invariably lead to a costly computing system.

Examples of the present invention provide a system and method of touch discrimination using a fisheye lens. According to one example, a horizontally-arranged touch-enabled display includes an imaging device having a fisheye lens. In a multi-user operating environment, image data captured by the fisheye lens is utilized to detect both a touch on a surface of the display and the user associated with said touch. Such a configuration provides a simplified and robust solution for touch discrimination involving multiple operating users.

Figure 1B:
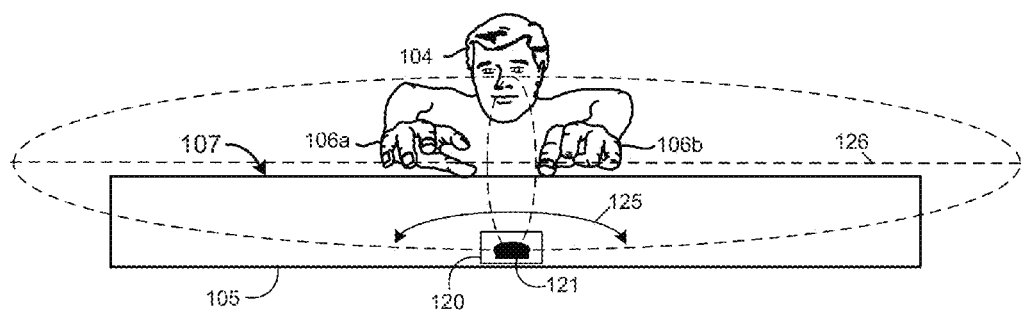
FIG. 1B is a front view of a user operating a horizontally-arranged display in accordance with an example of the present invention.

Referring now in more detail to the drawings in which like numerals identify corresponding parts throughout the views, FIG. 1A is a three-dimensional view of users operating a horizontally-arranged touch display, while FIG. 1B is a front view of a user operating a horizontally-arranged display in accordance with an example of the present invention. As shown in FIG. 1A, the system 100 includes a multi-touch-display 105 that is horizontally-arranged with respect to operating users 106 and 116. The operating users 106 and 116 are interacting with the display 105 at touch points 115a and 115b respectively by physically touching the upper or front surface 107 of display 105. According to one example, one or more depth cameras or imaging device 120 may be embedded within the surrounding border area 103 of the multi-touch display 105. In addition, the camera 120 is equipped with a fish-eye lens 121 so that the camera's field of view 125 is a hemispherical shape with its diameter substantially aligned and coplanar with the front surface 107 of the display 105. As a result, the system 100 is capable of determining the distance of objects (i.e., users) situated around the touch surface 107 to identify user's hands and fingers along with the body (e.g., arms, head) belonging thereto.

A front view of the touch discrimination system 100 is depicted in FIG. 1B. As shown in this example embodiment, an imaging device or camera 120 is embedded within the touch-sensitive display 105. The imaging device 120 includes a fisheye lens 121 having a hemispherical field of view 125 such that the view's diameter 126 is substantially aligned with the touch surface 107. The large viewing angle and depth of field provided by the fisheye lens allows for the imaging device 120 to capture considerable image data for objects positioned both on and around the display 105. For example, upon detecting a touch event, image data relating to the operating user's hands 106a,106b and the body part (i.e., head 104) associated with these hands, which may be further away from the sensor 120 than hands 106a and 106b, is capable of being captured using the fisheye lens 121 of imaging device 120.

Figure 2:
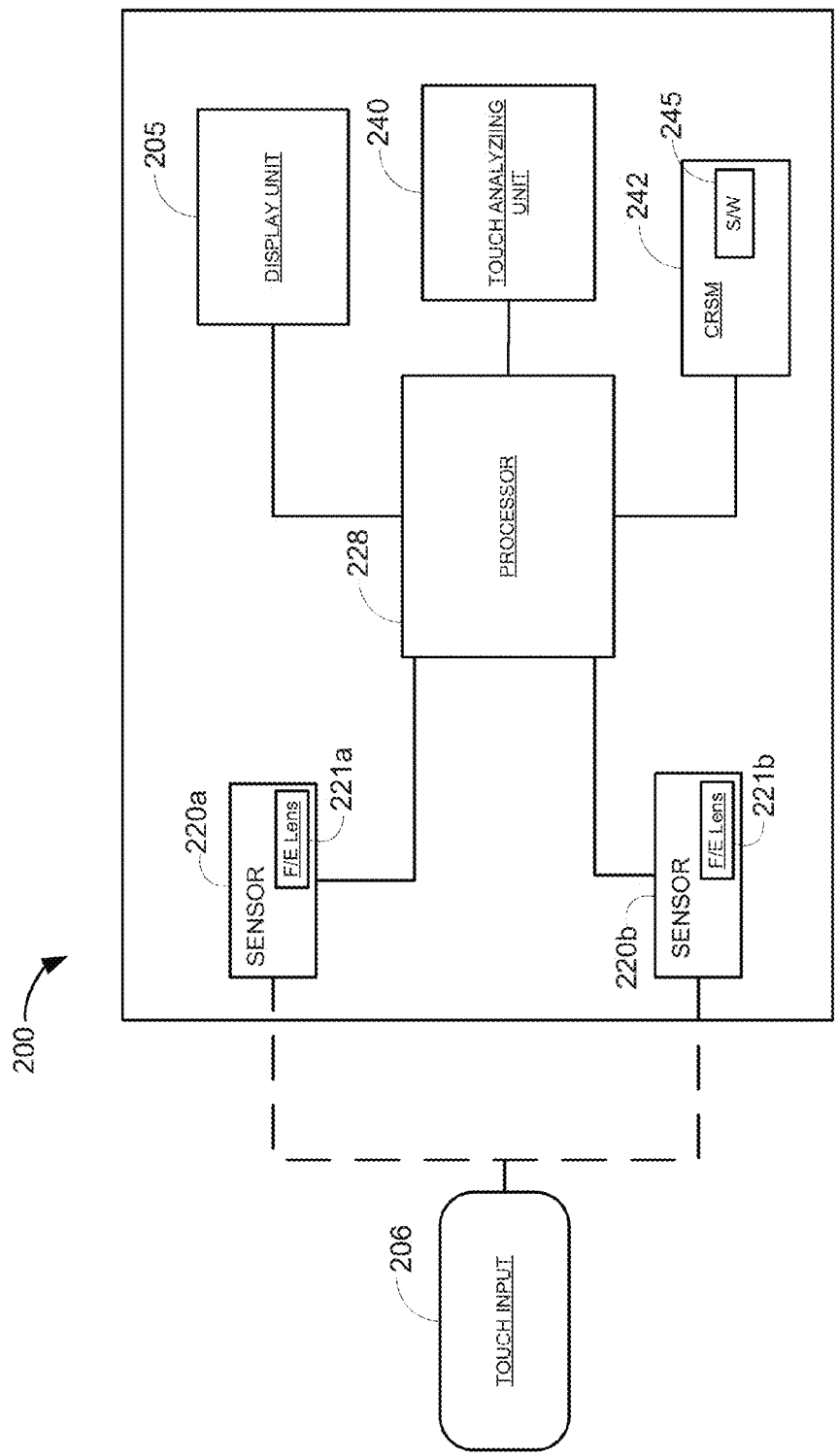
FIG. 2 is a simplified block diagram of a touch discrimination system using a fisheye lens according to an example of the present invention.

FIG. 2 is a simplified block diagram of a touch discrimination system implementing using a fisheye lens according to an example of the present invention. As shown in this example, the system 200 includes a processor 228 coupled to a display unit 205, imaging devices 220a and 220b, a touch analyzing unit 240, and a computer-readable storage medium 242. In one embodiment, processor 228 represents a central processing unit (CPU), microcontroller, microprocessor, or logic configured to execute programming instructions associated with the touch discrimination system 200. Display unit 205 represents an electronic visual and touch-sensitive display configured to display images and enable multi-touch interaction between a user and the computing system 200. Imaging devices 220a and 220b represent cameras and image sensors capable of converting an optical image into an electronic signal. Still further, each imaging device 220a and 220b includes a fisheye lens 221a and 221b respectively. Fisheye lens 2218 and 221b are circular or full-frame fisheye lenses and represent a type of wide angle lens that can capture a wide image of around 180 degrees or greater. Due to the wide image angle afforded by fisheye lenses, they are also able to capture a large depth of field such that images will appear sharply focused from front to back (i.e., foreground and background images—user's hands and head for example—are equally in focus). According to one example, the touch analyzing unit 240 is configured to analyze image data for determining the user(s) associated with each physical touch or touch event. Storage medium 225 represents volatile storage (e.g. random access memory), non-volatile store (e.g. hard disk drive, read-only memory, compact disc read only memory, flash storage, etc.), or combinations thereof. Furthermore, storage medium 242 includes software 245 that is executable by processor 228 and, that when executed, causes the processor 228 to perform some or all of the functionality described herein. For example, the touch analyzing unit 240 may be implemented as executable software within the storage medium 242.

Figure 3:
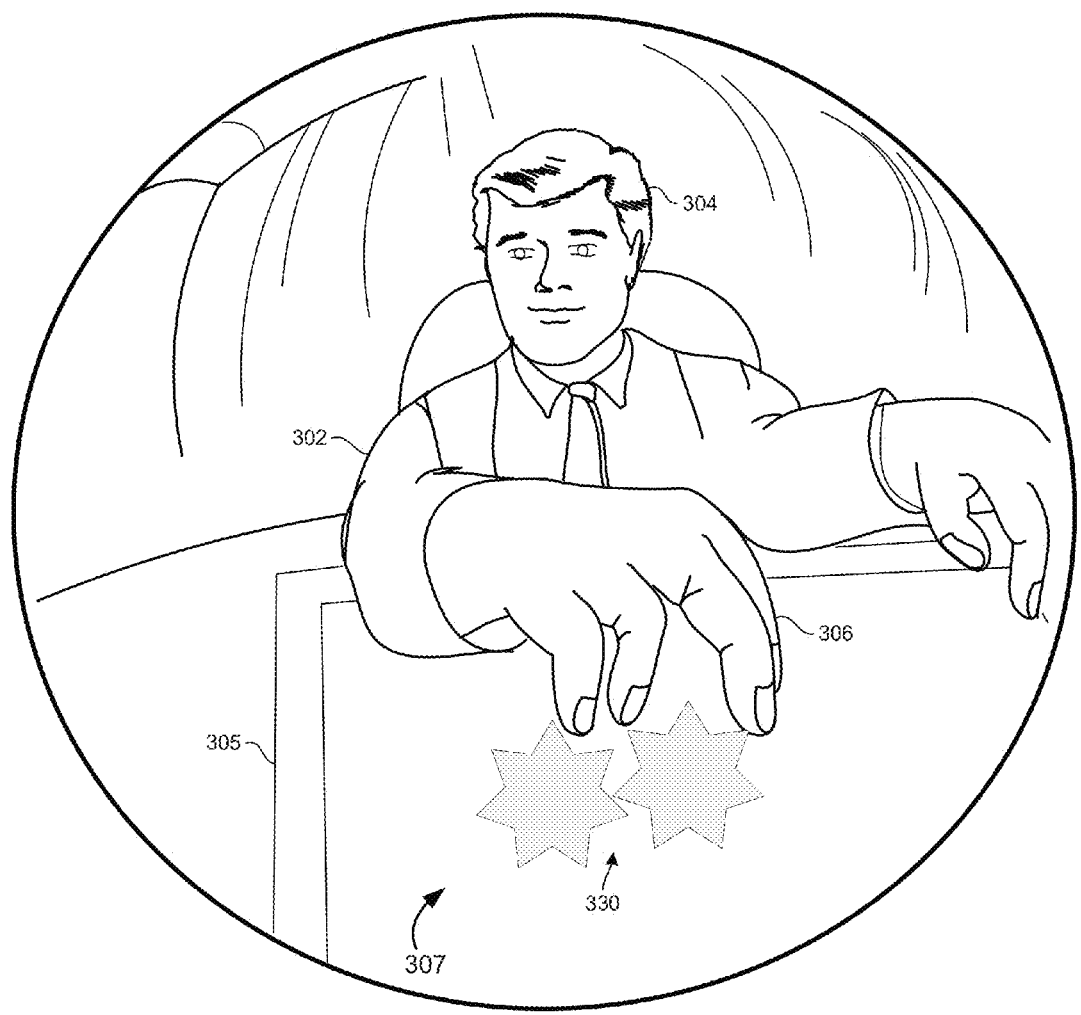
FIG. 3 is a sample view of image data captured by the imaging device and fisheye lens according to an example of the present invention.

FIG. 3 is a sample view of image data captured by the imaging device and fisheye lens according to an example of the present invention. As shown here, the fisheye lens returns an image of a user 302 operating the multi-touch display 305. In the present example, one hand 306 of the user 302 interacts with objects 330 displayed on the touch surface 307. As shown in the FIG. 1B, the fisheye lens produces a seemingly distorted image in which foreground objects (i.e., closer to the imaging device) appear larger than background objects (i.e., further from the imaging device). More importantly, both the foreground image of the user's hand 306 and background image of the user's head 304 are detailed and in focus. Consequently, the processor and/or touch analyzing unit is capable of easily determining the user 302 associated with the hand 306 involved in the touch interaction with the computing system.

Figure 4:
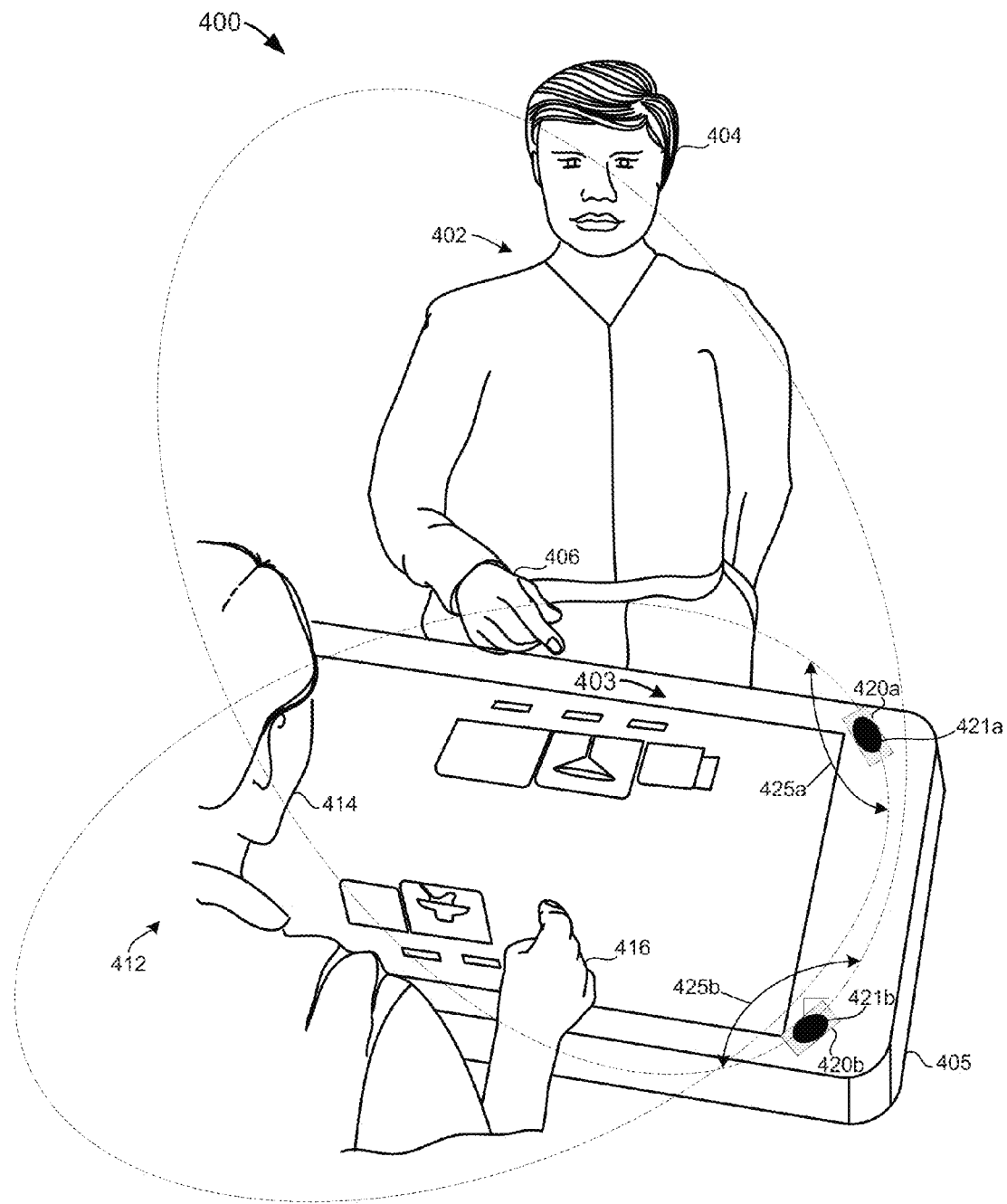
FIG. 4 is a three-dimensional view of multiple users operating a horizontally-arranged touch display using multiple fisheye lenses according to an example of the present invention.

FIG. 4 is a three-dimensional view of multiple users operating a horizontally-arranged touch display using multiple fisheye lenses according to an example of the present invention. In the present example, the touch discrimination system 400 includes a horizontally-arranged touch display and multiple imaging devices 420a and 420b positioned along the perimeter area 403 of the display 405. Moreover, multiple users 402 and 412 simultaneously operate and interact with the touch-sensitive display 405. Each imaging device 420a and 420b includes a fisheye lens 421a and 421b for capturing a wide angled field of view 425a and 425b that encompasses operating users 402 and 412. Positioning of the imaging devices 420a and 420b along corners of the border area 403 coupled with the field of view 425a and 425b afforded by the fisheye lenses 4218 and 421b respectively allows for image capture of both users 402 and 412. Here, imaging device 420a and fisheye lens 421a captures focused images of the hand 406 and head 404 associated with user 402, while imaging device 420b and fisheye lens 421b captures distinct images of the hand 416 and head 414 associated with user 412. Accordingly, simultaneous touch events from users 402 and 412 will be properly assigned to their respective user based on the captured image data.

Figure 5:
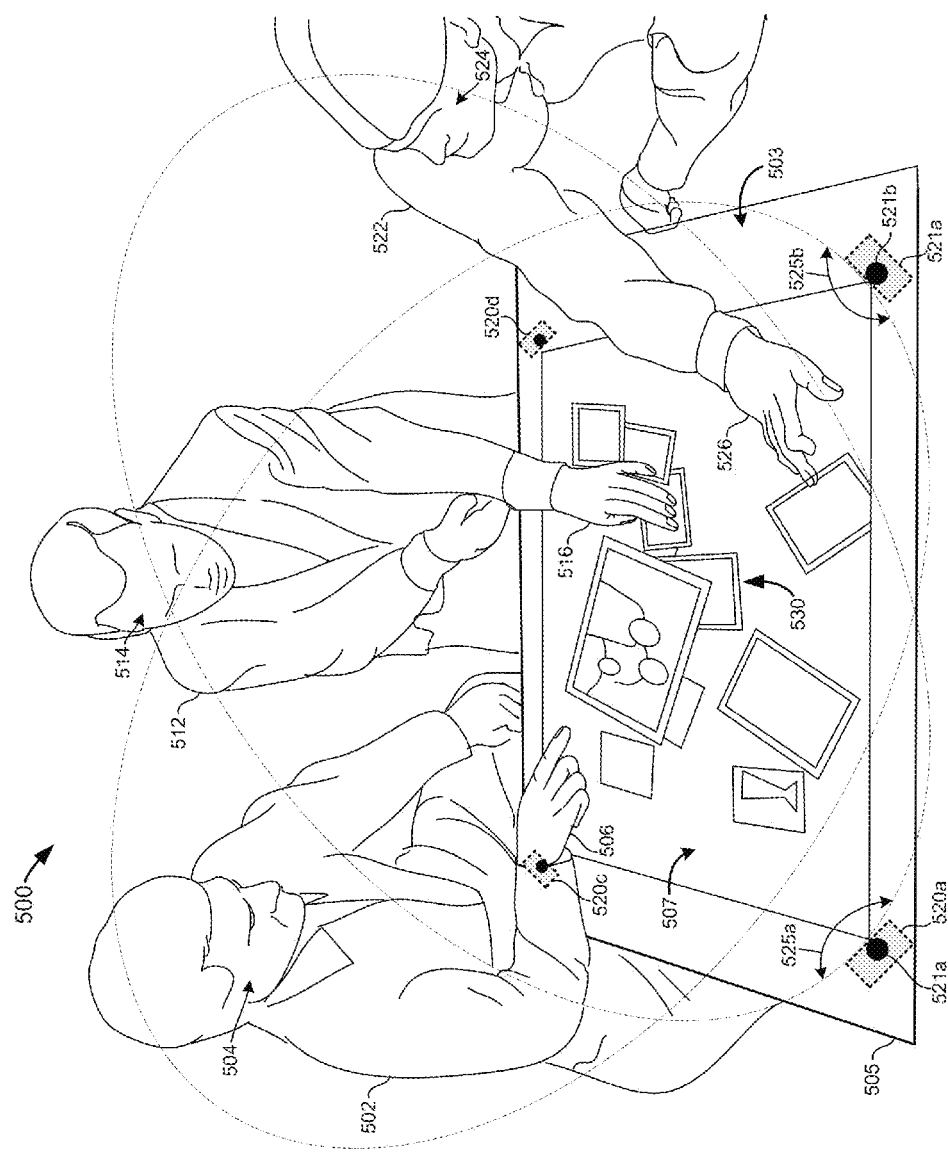
FIG. 5 is another three-dimensional view of multiple users operating a horizontally-arranged touch display using multiple fisheye lenses according to an example of the present invention.

FIG. 5 is another three-dimensional view of multiple users operating a horizontally-arranged touch display using multiple fisheye lenses according to an example of the present invention. As shown here, the touch discrimination system 500 includes a horizontally-arranged touch display 505 and multiple imaging devices 520a-520d positioned on corners along the perimeter area 503 of the display 505. Moreover, multiple users 502, 512, 522 simultaneously operate and interact with the touch-sensitive display 505. As in the previous example, each imaging device 520a-520d includes a fisheye lens 521a-521d for capturing a wide angled field of view of the operating users 502, 512, 522. By placing multiple imaging devices near corners of the touch surface 407, the system 500 is able to reduce errors due to occlusions caused by one user's finger/arm blocking a camera's view of another user's touch (e.g., hand 506 of user 502 blocks imaging device 520c). When a user touches the touch surface 507, the touch event is registered with processing unit based on image data from the imaging device(s) having the user and touch within its field of view (e.g., 525a and 525b). Since the imaging device can see in all directions within the hemispherical field of view provided by the fisheye lens, the touch analyzing unit/processor can use the imaging data to detect the hand making the touch, the arm attached to the hand, and the body/head/face attached to the arm. In the present example, imaging device 520a and fisheye lens 521a captures focused images of the hand 516 and body/head/face 514 associated with user 512, imaging device 520b and fisheye lens 521b captures distinct images of the hand 506 and body/head/face 504 associated with user 502, while both imaging devices 520a and 520b may capture image data associated with the hand 526 and body/head/face 522 of user 524. In accordance therewith, simultaneous touches from users 502, 512, and 522 may be properly assigned to their respective user through analysis of the captured image data.

Figure 6:
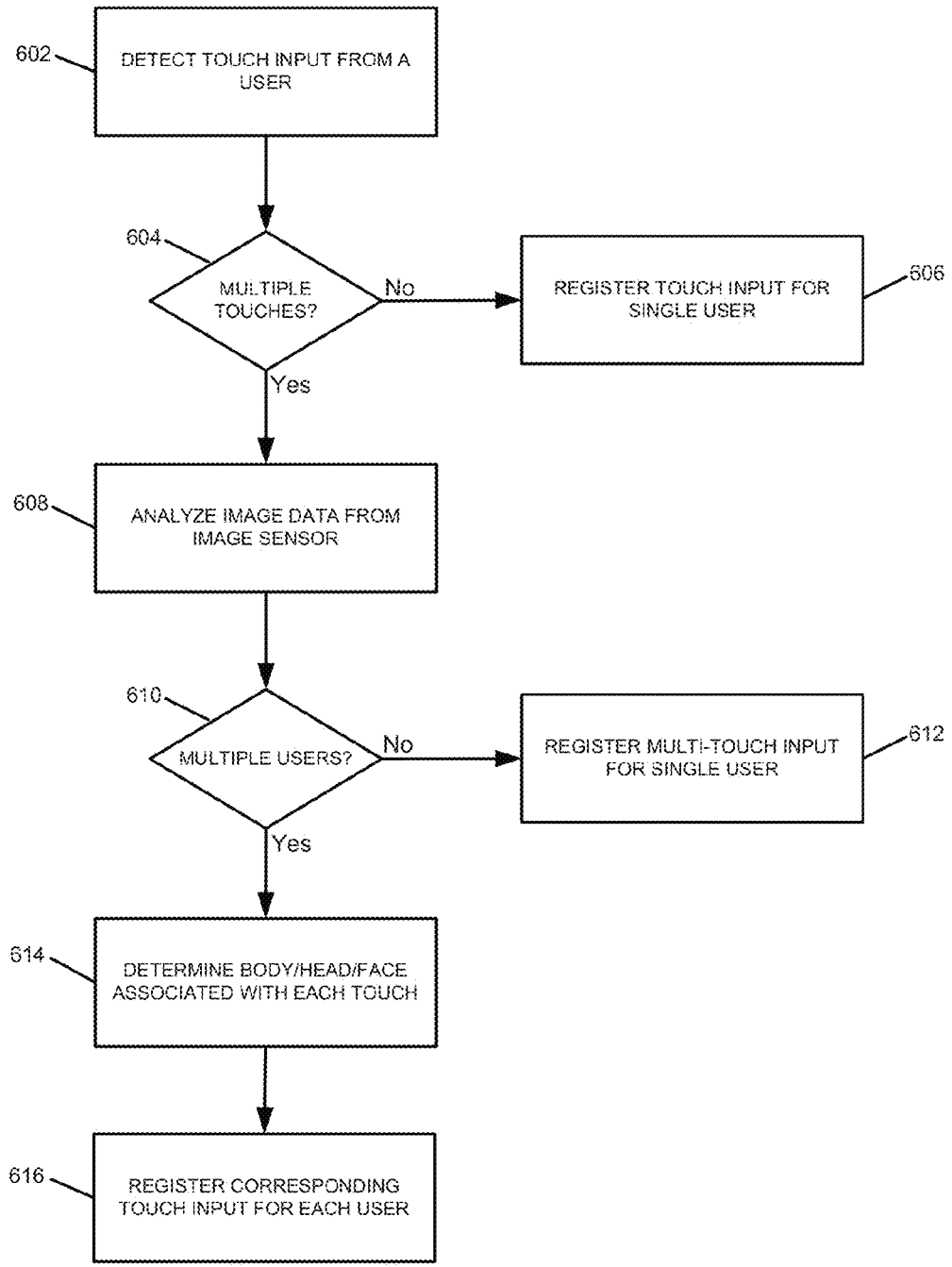
FIG. 6 is a simplified flow chart of the processing steps for touch discrimination using a fisheye lens in accordance with an example of the present invention.

FIG. 6 is a simplified flow chart of the processing steps for touch discrimination using a fisheye lens in accordance with an example of the present invention. In step 602, touch input from at least one user is detected by the touch discrimination system. Initial touch detection may occur via recognition by imaging devices, a capacitive touch screen, or any other touch detection method as will be appreciated by one skilled in the art. In step 604, the processing unit determines if the touch event involves multiple touches (e.g., multiple fingers). If the processing unit determines only a single touch, then the processing unit may register the touch input with a single operating user in step 606. If not, then in step 608 the processor and/or touch analyzing unit analyzes the image data from the imaging device(s). In step 610, the processing unit determines if the multiple touches involved multiple users. If not, then the processor registers the touch input as a multi-touch event for a single user in step 612. On the other hand, if the user determines that the touch input does involve multiple users, then the processor and/or touch analyzing unit analyzes the image data to determine a body associated with each body part that touches the touch surface in step 614. For example, the processing unit may use the image data to trace the chain of use from the contact hand of the user to the arm and then to the body, head, or face of an operating user. Thereafter, in step 616, the processing unit registers the touch input for each corresponding operating user.

Many advantages are afforded by the touch discrimination method and system in accordance with examples of the present invention. For example, the present examples do not require the user to wear or use any special equipment for touch identification. Moreover, since the lens can be implemented within many existing touch display cameras, the system can be quickly and easily incorporated into current computing systems. Still further, processing power is conserved as only simple image data is analyzed for executing touch discrimination of the example embodiments.

Furthermore, while the invention has been described with respect to exemplary embodiments, one skilled in the art will recognize that numerous modifications are possible. For instance, although example embodiments depict a large "table-top" computing system as the representative touch display, the invention is not limited thereto. For example, the touch display may be a netbook, a tablet personal computer, a all-in-one personal computer, or any other computing system capable of supporting multiple and simultaneous user touch input. Furthermore, imaging devices may be placed at any position along the border area of the display rather than the corners of the display as described and depicted in the examples discussed above. Thus, although the invention has been described with respect to exemplary embodiments, it will be appreciated that the invention is intended to cover all modifications and equivalents within the scope of the following claims.

What is claimed is:

1. A touch discrimination system comprising:
   a touch-enabled display;
   multiple imaging devices embedded within a surrounding border of the touch-enabled display, each imaging device including a fisheye lens providing a hemispherical field of view with a diameter substantially aligned and coplanar with a surface of the touch-enabled display;
   a memory resource to store instructions; and
   one or more processors using the instructions stored in the memory resource to:
      detect a plurality of simultaneous touch inputs on the surface of the touch-enabled display performed by a plurality of operating users;
      obtain image data from the multiple imaging devices for each of the plurality of simultaneous touch inputs, the image data simultaneously depicting, in the hemispherical fields of view, (i) a hand or finger in contact with the surface of the touch-enabled display corresponding to each of the plurality of simultaneous touch inputs, and (ii) a portion of a body corresponding to the hand or finger, wherein the portion of the body is outside a perimeter of the touch-enabled display;
      associate each hand or finger in contact with the surface of the touch-enabled display with one of the plurality of simultaneous touch inputs, wherein each association is determined using only the image data and the plurality of simultaneous touch inputs; and
      identify a user of the plurality of operating users who made each of the plurality of simultaneous touch inputs based on the portion of the body outside the perimeter of the touch-enabled display that corresponds to each hand or finger associated with each of the plurality of simultaneous touch inputs, wherein each user is identified by analyzing the image data without any other sensor data.

2. A method for touch discrimination on a touch-enabled display, the method comprising:
   detecting, via imaging devices embedded within a surrounding border of the touch-enabled display, simultaneous touch inputs on a surface of the touch-enabled display performed by a plurality of operating users, wherein each imaging device includes a fisheye lens providing a hemispherical field of view with a diameter substantially aligned and coplanar with the surface of the touch-enabled display;
   obtaining image data from the imaging devices for the simultaneous touch inputs, the image data simultaneously depicting (i) user contact with the surface of the touch-enabled display corresponding to each of the simultaneous touch inputs, and (ii) a portion of a body, corresponding to the user contact, outside a perimeter of the touch-enabled display;
   associating, via a processor, each user contact with one of the simultaneous touch inputs using only the image data and the simultaneous touch inputs; and
   identifying, via the processor, a user of the plurality of operating users who made each of the simultaneous touch inputs based on the portion of the body outside the perimeter of the touch-enabled display corresponding to each user contact associated with each of the simultaneous touch inputs, wherein each user is identified by analyzing the image data without any other sensor data.

3. A non-transitory computer readable storage medium for touch discrimination having stored executable instructions, that when executed by a processor, causes the processor to:
   detect, via multiple imaging devices embedded within a surrounding border of a touch-enabled display, a plurality of simultaneous touch inputs on a surface of the display performed by a plurality of operating users, wherein the multiple imaging devices include a fisheye lens providing a hemispherical field of view with a diameter substantially aligned and coplanar with the surface of the touch-enabled display;
   obtain image data from the multiple imaging devices for each of the plurality of simultaneous touch inputs, the image data simultaneously depicting, in the hemispherical fields of view, (i) a hand or finger in contact with the surface of the touch-enabled display corresponding to each of the plurality of simultaneous touch inputs, and (ii) a portion of a body corresponding to the hand or finger, wherein the portion of the body is outside a perimeter of the touch-enabled display;
   associate each hand or finger in contact with the surface of the touch-enabled display with one of the plurality of simultaneous touch inputs, wherein each association is determined using only the image data and the plurality of simultaneous touch inputs; and identify a user of the plurality of operating users who made each of the plurality of simultaneous touch inputs based on the portion of the body outside the perimeter of the touch-enabled display that corresponds to each hand or finger associated with each of the plurality of simultaneous touch inputs, wherein each user is identified by analyzing the image data without any other sensor data.

* * * * *